United States Patent Office 3,826,799
Patented July 30, 1974

---

3,826,799
COPPER CONTAINING AZO TRIAZINE COMPOUNDS
David Richard Waring, Manchester, England, assignor to Imperial Chemical Industries Limited, London, England
No Drawing. Filed Aug. 11, 1972, Ser. No. 279,788
Int. Cl. C09b 45/48
U.S. Cl. 260—146 T  4 Claims

ABSTRACT OF THE DISCLOSURE

Cellulose-reactive dyestuffs, providing usually green or brown shades of excellent fastness to light, washing and bleach treatments and providing a high level of fixation from alkaline, saline dyebaths are obtained by condensing togeher cyanuric chloride (2 moles) with one mole of a phenylene diamine sulphonic acid, one mole of a 1:1 copper complex aminoazo compound and one mole of nitroaminostilbene disulphonic acid or an amino mono-azo compound of the formula $$NHR_2\text{—}R_3\text{—}N=N\text{—}R_4$$

where $R_2$ represents H or $CH_3$,
$R_3$ represents a 1,4-naphthylene radical which may be substituted by $SO_3H$ and/or $OCH_3$, or a 1,4-phenylene radical which may be substituted by $CH_3$, $OCH_3$, Cl, $CO_2H$, $SO_3H$, $NHCONH_2$ or $NHCOR_5$ where $R_5$ is H or an alkyl group of 1 to 3 carbon atoms, and
$R_4$ represents a sulphonaphthyl radical or a mono- or di-cyclic radical of the benzene series which contains at least one $SO_3H$ group and which may be further substituted.

The condensations are carried out in such a manner as to provide a product of the formula:

Me—Tr—Bz—Tr—Az where Tr are each monochlorotriazine residues, Bz is the residue of the phenylene diamine disulphonic acid and Me and Az are respectively the residues of the metal complex and the monoazo compounds.

---

This invention relates to new azo dyestuffs primarily valuable for the colouration of cellulose textile materials.
According to the invention there are provided azo dyestuffs represented by the general formula:

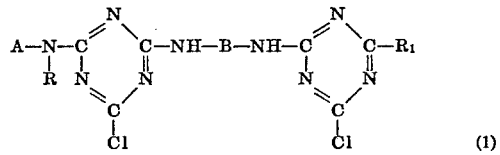
(1)

wherein
R represents H or $CH_3$,
—NR—A represents the residue of a 1:1 copper complex aminoazo compound having the NR group attached to a naphthalene nucleus,
B represents a monosulphophenylene radical having the sulpho group ortho to one of the NH groups, and
$R_1$ represents a radical of the formula:

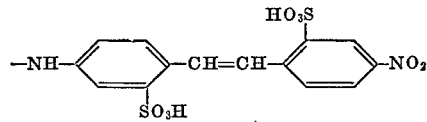
(2)

or of the formula:

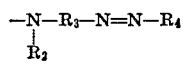
(3)

wherein
$R_2$ represents H or $CH_3$,
$R_3$ represents a 1,4-naphthylene radical which may be substituted by $SO_3H$ and/or $OCH_3$, or a 1,4-phenylene radical which may be substituted by $CH_3$, $OCH_3$, Cl, $CO_2H$, $SO_3H$, $NHCONH_2$ or $NHCOR_5$ where $R_5$ is H or an alkyl group of 1 to 3 carbon atoms, and
$R_4$ represents a sulphonaphthyl radical or a mono- or di-cyclic radical of the benzene series which contains at least one $SO_3H$ group and which may be further substituted.

In formula (1), the symbol A can, for example, represent the radical of a 1:1-copper complex mono- or bis-azo compound. The term 1:1 used herein means that the copper atom is complexed to one azo group so that, for example, a bisazo compound could contain 2 atoms of copper per molecule. The NR group of formula (1) is attached to a naphthalene nucleus in A, typical examples of A being, e.g. radicals of the o,o'-dihydroxyazonaphthalene, o,o' - dihydroxyphenylazonaphthalene and (p'-phenylazo - o' - hydroxyphenylazo)o-hydroxynaphthalene series.

As examples of radicals represented by B, there may be mentioned 2-sulpho-1,4-phenylene and 4-sulpho-1,3-phenylene.

As examples of mono- or di-cyclic radicals of the benzene series represented by $R_4$, there may be mentioned sulphophenyl, which may be further substituted, also radicals of the diphenyl, diphenyloxide, diphenylmethane, diphenylamine, diphenylethane and stilbene series, which contain at least one $SO_3H$ group and which may be further substituted. Typical substituents in $R_4$, are, e.g. $CH_3$, $OCH_3$, Cl, $SO_3H$, $NHCOCH_2$ and $NO_2$.

The new azo dyestuffs provide a wide range of secondary or tertiary shades, e.g. green and brown shades of various degrees of dullness, having excellent fastness to light and to washing and bleaching treatments, and are distinguished by the unusually high proportion of dye in the dyebath which reacts with cellulose textile materials when applied from saline, alkaline dyebaths.

A preferred class of the new dyestuffs is represented by formula (1) wherein A represents the radical of a 1:1 copper complex of an o,o'-dihydroxyazonaphthalene poly-sulphonic acid, more especially a radical of the formula:

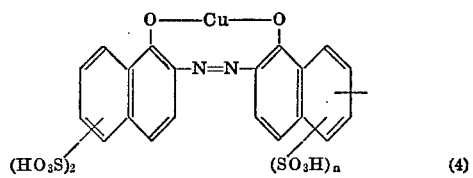
(4)

in which n is 1 or 2.

A further preferred class of the new dyestuff is represented by formula (1) wherein A represents a radical of a 1:1 copper complex of an o,o'-dihydroxyphenylazo-naphthalene polysulphonic acid, more especially a radical of the formula:

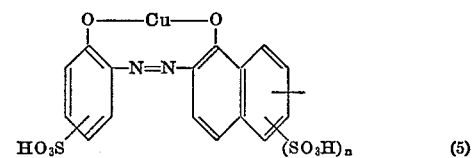
(5)

wherein n has a value 1 or 2 and the benzene nucleus may be further substituted by Cl, $NO_2$ or $SO_3H$.

Yet a further especially valuable class of dyestuffs are those in which A represents a radical of a 1:1 copper complex of a phenylazo-o'-hydroxyphenylazo-o-naphthol having the general formula:

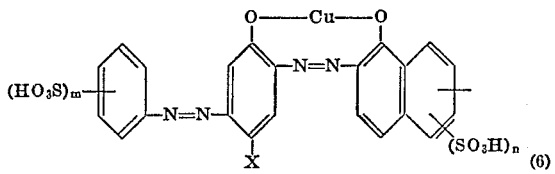

wherein X represents H, CH$_3$ or CH$_3$O and $m$ and $n$ each independently represents 1 or 2.

In association with the radicals of formulae (4), (5) and (6), the preferred meaning of B is the 4-sulpho-1,3-phenylene radical and the preferred meaning of R is a radical of formula (3) in which R$_2$ is CH$_3$, R$_3$ is an unsubstituted 1,4-phenylene radical, and R$_4$ is a 4'-nitro-2,2'-disulphostilbene (4) radical i.e. having the formula:

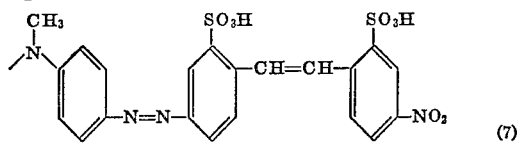

The invention also provides a process for manufacture of the new dyestuffs which comprises reacting cyanuric chloride, in either order, with one mole of a 1:1-copper complex aminoazo compound of formula ANHR, and one mole of an amino compound of formula:

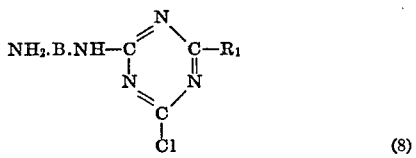

the symbols A, R, B and R$_1$ having the meanings stated earlier.

The invention also provides a modification of the above process in which cyanuric chloride is reacted, in either order, with one mole of an amino compound of the formula:

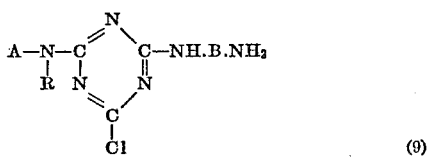

and with one mole of 4-nitro-4'-aminostilbene-2,2'-disulphonic acid or an aminoazo compound of the formula:

NHR$_2$—R$_3$—N=R$_4$     (10)

the symbols A, R, B, R$_2$, R$_3$ and R$_4$ having the meanings stated above.

Either process of the invention can conveniently be carried out by stirring a suspension of the cyanuric chloride in an aqueous medium with the first of the amino compounds at a temperature of 0 to 5° C. until one chlorine atom of the cyanuric chloride has reacted, then adding the second amino compound and continuing reaction at a somewhat higher temperature, usually in the range 40 to 45° C., until a second chlorine atom of the cyanuric chloride has reacted. The condensations are preferably carried out at a pH of from 6 to 7, adding an acid-binding agent to neutralise the hydrochloric acid formed during the reaction. When reaction is complete the new dyestuffs can be isolated by the usual techniques adopted for isolation of water-soluble reactive dyestuffs, e.g. by salting out and filtration or by spray-drying the reaction mixture in which the dyestuff has been formed. If desired, stabilisers e.g. mixtures of alkali metal hydrogen phosphates can be added.

The amino compounds of formula (8) can themselves be obtained by condensing cyanuric chloride with 1 mole of a phenylene diamine of formula NH$_2$·B·NH$_2$ and 1 mole of 4-nitro-4'-aminostilbene-2,2'-disulphonic acid or an amino compound of formula (10); similarly the amino compounds of formula (9) can be obtained by condensing cyanuric chloride with 1 mole of an amine of formula A—NHR and 1 mole of a phenylene diamine of formula NH$_2$·B·NH$_2$. Thus the above processes of the invention constitute special cases of the process of condensing two moles of cyanuric chloride with: (a) 1 mole of a 1:1-copper complex aminoazo compound of formula ANHR, (b) 1 mole of a phenylene diamine sulphonic acid of formula NH$_2$·B·NH$_2$, and (c) 1 mole of 4-nitro-4'-aminostilbene - 2,2' - disulphonic acid or an aminoazo compound of formula (10), the condensations being carried out in a manner which leads to formation of the dyestuffs of formula (1).

As examples of phenylene diamine sulphonic acids which may be used, there may be mentioned:

1,4-diaminobenzene-2-sulphonic acid,
1,3-diaminobenzene-4-sulphonic acid.

As examples of classes of compounds of formula A—NHR which may be used, there may be mentioned:

(a) 1:1 copper complexes of monoazo compounds of the formula:

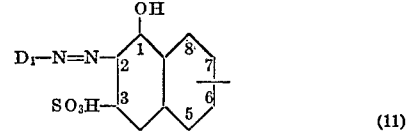

wherein D$_1$ represents a mono- or di-cyclic aryl radical which is free from azo groups and contains a OH or CO$_2$H group *ortho* to the azo group, and the NHR group is preferably attached to the 6-, 7- or 8-position of the naphthalene nucleus, which may contain a sulphonic acid group in the 5- or 6-position to the naphthalene nucleus.

Particularly valuable dyestuffs are obtained from those werein D$_1$ represents a sulphonated o-hydroxyphenyl or o-hydroxynaphthyl radical; the phenyl radical may be further substituted for example, by halogen atoms such as chlorine, alkyl radicals such as methyl, acylamino groups such as acetylamino and alkoxy radicals such as methoxy.

(b) 1:1 copper complexes of disazo compounds of formula (11) wherein D$_1$ stands for a radical of the azobenzene, azonaphthalene or phenylazo-naphthalene series containing a metallisable group *ortho* to the depicted azo group and the naphthalene nucleus is substituted by the NHR group, and optionally by sulphonic acid as in class (a).

(c) 1:1 copper complexes of mono- or dis-azo compounds of the formula:

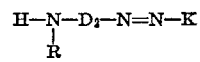

wherein D$_2$ represents naphthalene radical containing a metallisable group *ortho* to the azo group, and K represents the radical of a naphthol sulphonic acid having the OH group *ortho* to the azo group.

As examples of particular compounds of formula D$_2$NHR there may be mentioned the following:

the copper complex of 6',8-diamino-1,1'-dihydroxy-2,2'-azonaphthalene-4',5,7,8'-tetrasulphonic acid,
the copper complex of 8-amino-1-hydroxy-2-(2'-hydroxy-3'-chloro-5'-sulphophenylazo)naphthalene - 3,5 - disulphonic acid,
the copper complex of 8-amino-1-hydroxy-5,7-disulpho-2-(2'-hydroxy-5'-amino - 3' - sulphophenylazo)naphthalene,
the copper complex of 1,2'-dihydroxy-6',8-diamino-1',2'-azonaphthalene-4',5,7-trisulphonic acid,
the copper complex of 6-amino-8'-benzoylamino-1,1'-dihydroxy-2,2'-azonaphthalene - 3',4,6',8 - tetrasulphonic acid, the copper complex of 8-amino-1-hydroxy-2-(2'-hydroxy-5'-sulphophenylazo)naphthalene-3:6-disulphonic acid, the copper complex of 6-amino-1-hydroxy-2-(2'-hydroxy-5'-sulphophenylazo)naphthalene-3-sulphonic acid, the copper complex of 6-amino-1-hydroxy-2-(2'-hydroxy-5'-sulphophenylazo)naphthalene-3:5-disulphonic acid, the copper complex of 8-amino-1,1'-dihydroxy-2,2'-azonaphthalene-3,4',6,8'-tetrasulphonic acid, the copper complex of 8-amino-1-hydroxy-2[4'-(2''-sulphophenylazo) - 2' - hydroxy - 5' - methylphenylazo] naphthalene-3:6-disulphonic acid and the copper complex of 6-amino-1-hydroxy-2-[4'-(2'':5''-disulphophenylazo)-2'-hydroxy - 5' - methylphenylazo] naphthalene-3,5-disulphonic acid.

The compounds of formula (10) used can be obtained by sulphonating aminoazobenzene or by diazotising an aniline- or naphthylamine-sulphonic acid, which may be further substituted, and coupling with a p-coupling amine of the benzene or naphthalene series; as examples of diazo components there may be mentioned:

aniline o-, m- and p-sulphonic acids,
2-aminotoluene-4- and -5-sulphonic acids,
aniline-2,4-, 2,5- and 3,5-disulphonic acids,
1-aminonaphthalene-5- and -6-sulphonic acids,
2-aminonaphthalene-1,5- 4,8- and 6,8-disulphonic acids,
2-aminoanaphthalene-3,6,8- and 4,6,8-trisulphonic acids.

As examples of coupling components, there may be mentioned:

aniline,
o- and m-anisidines,
anthranilic acid,
o- and m-toluidines,
2,5-dimethoxyaniline,
cresidine,
m-aminoacetanilide,
m-aminophenylurea,
1-aminonaphthalene-6-, 7- and 8-sulphonic acids,
1-aminonaphthalene-6,8-disulphonic acid,
N-ethylaniline,
N-methyl-o-anisidine,
N-$\beta$-hydroxyethyl-m-toluidine.

The new reactive dyestuffs are valuable for colouring cellulose textile materials comprising natural or regenerated cellulose. For colouring such materials, the new dyestuffs are preferably applied, either by a printing or dyeing process to the cellulose textile material in conjunction with an acid-binding agent, e.g. caustic soda, sodium carbonate, phosphate, silicate, or bicarbonate, which may be applied to the cellulose textile material before, during or after application of the dyestuff. The new dyestuffs are particularly suitable for application from saline alkaline dyebaths from which an unusually high proportion of the dyestuff present reacts with the fibre. In consequence, a variety of strong shades, especially greens or browns, are obtained on the textile material giving excellent fastness to light and to wet treatments, especially washing and bleach treatments.

The invention is illustrated by the following Examples in which parts and percentages are by weight:

EXAMPLE 1

12.5 parts of the trisodium salt of the copper complex of 6 - amino-2-(2'-hydroxyphenylazo)naphthalene-3,5,5'-trisulphonic acid are dissolved in 400 parts of water and the pH of the solution is adjusted to 6.5 and cooled to 0–5° C. in ice bath. A solution of 4 parts of cyanuric chloride in 40 parts of acetone is added and the pH is maintained at 6–6.5 by addiiton of 2N sodium carbonate solution. Reaction is complete in 15 minutes. The mixture is filtered from excess cyanuric chloride then stirred and heated at 35–40° C. and 3.8 parts of 1,4-phenylenediamine-2-sulphonic acid are added. The pH is maintained at 4–5 by addition of 2N sodium carbonate, for 2 hours then the solution is cooled to 0–5° C. and the pH raised to 6.5. A solution of 4 parts of cyanuric chloride in 40 parts of acetone is added and the pH is maintained at 6–6.5 by addition of 2N sodium carbonate as required. Reaction is complete in 1 hour and the mixture is filtered and stirred and heated to 40° C. A solution of 10.06 parts of the disodium salt of 4-nitro-4'-(4''-methylaminophenylazo)stilbene-2,2'-disulphonic acid in 200 parts of water is added and the mixture is stirred at pH 6–7 and 40° C. for 18 hours to complete reaction. The mixture is cooled to room temperature, salted 20% w./v. with sodium chloride and the precipitate filtered off and dried in air at 35° C. The dyestuff so obtained dyes cotton from an alkaline bath at 80° C. in orange brown tints of high percentage fixation which are fast to light and washing.

The following table describes other dyestuffs of the invention, being obtained in a similar manner to Example 1 by condensing cyanuric chloride with the compound in column II, followed by selective condensation at pH 4–5 with a molecule of the diamine in column III and then further condensation with cyanuric chloride and finally with an equivalent of the compound in column IV. The shade obtained is given in column V.

| Example | II | III | IV | Shade |
|---|---|---|---|---|
| 2 | Cu complex of 8-amino-1,1'-dihydroxy-2,2'-azonaphthalene-3,4',6,8'-tetrasulphonic acid. | 1,4-phenylenediamine-2-sulphonic acid. | 4-nitro-4'-(4''-methylaminophenylazo)-stilbene-2,2'-disulphonic acid. | Olive-green. |
| 3 | Cu complex of 8-amino-1-hydroxy-2-(5'-methoxy-2'-hydroxyphenylazo)naphthalene-3,4',6-trisulphonic acid. | 1,3-phenylenediamine-4-sulphonic acid. | 2-(4'-aminophenylazo)-naphthalene-4,8-disulphonic acid. | Greyish-green. |
| 4 | Cu complex of 6'-nitro-6-amino-1,1'-dihydroxy-2,2'-azonaphthalene-3,4',5,8'-tetrasulphonic acid. | do | 4-nitro-4'-(4''-methylaminophenylazo)-stilbene-2,2'-disulphonic acid. | Green. |
| 5 | do | do | 2-(4'-amino-2'-methylphenylazo)-naphthalene-4,8-disulphonic acid. | Olive-green. |
| 6 | do | do | 4-amino-4'-nitrostilbene-2,2'-disulphonic acid. | Do. |
| 7 | do | 1,4-phenylenediamine-2-sulphonic acid. | do | Olive. |
| 8 | Cu complex of 8-amino-1,1'-dihydroxy-2,2'-azonaphthalene-3,4',6,8'-tetrasulphonic acid. | do | do | Green. |
| 9 | Cu complex of 8-amino-1,1'-dihydroxy-2,2'-azonaphthalene-3,4',6,8'-tetrasulphonic acid. | 1,3-phenylenediamine-4-sulphonic acid. | 2-(4'-amino-2'-ureidophenylazo)-naphthalene-3,6,8-trisulphonic acid. | Green. |
| 10 | do | do | 4-(4''-methylaminophenylazo)-4'-nitrostilbene-2,2'-disulphonic acid. | Do. |
| 11 | Cu complex of 8-amino-2-(5'-methoxy-2'-hydroxyphenylazo)-1-naphthol-3,4',6-trisulphonic acid. | do | do | Do. |
| 12 | do | do | 2-(4'-amino-2'-ureidophenylazo)-naphthalene-3,6,8-trisulphonic acid. | Do. |
| 13 | do | 1,4-phenylenediamine-2-sulphonic acid. | 4-(4''-methylaminophenylazo)-4'-nitrostilbene-2,2'-disulphonic acid. | Do. |
| 14 | Cu complex of 8-amino-2-(2'-hydroxy-3'-chlorophenylazo)-1-naphthol-3,5',6-trisulphonic acid. | do | do | Brown. |
| 15 | do | do | 2-(4'-amino-2'-methylphenylazo)-naphthalene-4,8-disulphonic acid. | Do. |

TABLE—Continued

| Example | II | III | IV | Shade |
|---------|----|----|----|-------|
| 16 | Cu complex of 8-amino-2-(2'-hydroxy-3'-chlorophenylazo)-1-naphthol-3,5'-6-trisulphonic acid. | 1,4-phenylenediamine-2-sulphonic acid. | 4-amino-4'-nitrostilbene-2,2'-disulphonic acid. | Brown. |
| 17 | Cu complex of 8-amino-2-(2'-hydroxyphenylazo)-1-naphthol-3,5',6-trisulphonic acid. | 1,3-phenylenediamine-4-sulphonic acid. | 4-(4''-methylaminophenylazo)-4'-nitrostilbene-2,2'-disulphonic acid. | Do. |
| 18 | do | do | 2-(4'-amino-2'-methylphenylazo)naphthalene-4,8-disulphonic acid. | Do. |
| 19 | Cu complex of 6-amino-2-(2'-hydroxyphenylazo)-1-naphthol-3,5,5'-trisulphonic acid. | do | 2-(4'-amino-2'-ureidophenylazo)naphthalene-3,6,8-trisulphonic acid. | Do. |
| 20 | Cu complex of 8-amino-6'-nitro-1,1'-dihydroxy-2,2'-azonaphthalene-3,4',6,8'-tetrasulphonic acid. | 1,4-phenylenediamine-2-sulphonic acid. | do | Olive-green. |
| 21 | Cu complex of 6-amino-1-hydroxy-2-[2'-hydroxy-5'-methyl-4'-(phenylazo)phenylazo]naphthalene-2'',3,5,5''-tetrasulphonic acid. | 1,3-phenylenediamine-4-sulphonic acid. | 4-(4''-methylaminophenylazo)-4'-nitrostilbene-2,2-disulphonic acid. | Do. |
| 22 | do | 1,4-phenylenediamine-3-sulphonic acid. | 4-amino-4'-nitrostilbene-2,2'-disulphonic acid. | Green. |
| 23 | Cu complex of 6-methylamino-1-hydroxy-2-[2'hydroxy-5'-methyl-4'-(phenylazo)phenylazo]naphthalene-2'',3,5''-trisulphonic acid. | 1,4-phenylenediamine-3-sulphonic acid. | 4-amino-4'-nitrostilbene-2,2'-disulphonic acid. | Green. |
| 24 | do | 1,3-phenylenediamine-4-sulphonic acid. | 4-(4''-methylaminophenylazo)-4'-nitrostilbene-2,2'-disulphonic acid. | Olive-green. |
| 25 | do | do | 2-(4'-amino-2'-methylphenylazo)naphthalene-4,8-disulphonic acid. | Do. |

What we claim is:

1. A 1:1 copper complex azo dyestuff of the formula

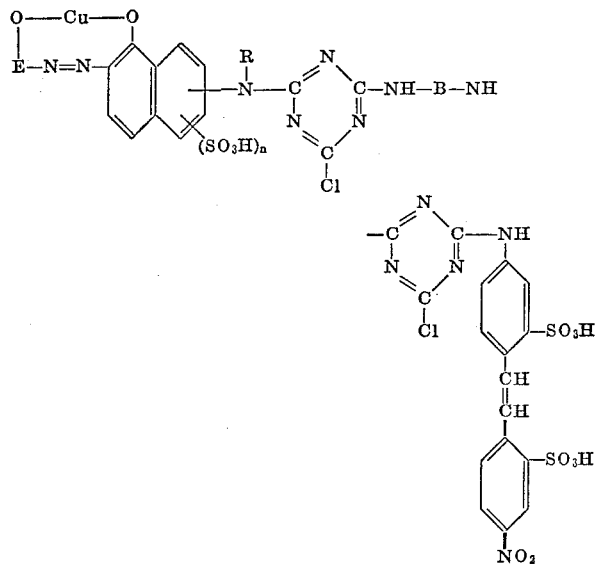

wherein
R represents H or $CH_3$,
n is 1 or 2,
E represents a member selected from the group consisting of benzene and naphthylene, said member having up to three substituents selected from the group consisting of sulphonic acid, methyl, methoxy, chlorine, nitro and disulphophenylazo, the —O— atom being attached ortho to the azo group, and
B represents monosulphophenylene, the sulpho group being ortho to one of the NH groups.

2. The dyestuff of claim 1 wherein E represents a member selected from the group consisting of disulphonaphthalene and disulpho-nitronaphthalene.

3. The dyestuff of claim 1 wherein E represents a member selected from the group consisting of sulphophenyl, methoxysulphophenyl, sulphochlorophenyl and (disulphophenylazo) methylphenyl.

4. The dyestuff of claim 1 wherein B represents 4-sulpho-1,3-phenylene.

References Cited

UNITED STATES PATENTS

| | | | |
|---|---|---|---|
| 3,646,002 | 2/1972 | Andrew et al. | 260—146 T |
| 3,664,995 | 5/1972 | Andrew et al. | 260—146 T |
| 3,084,152 | 4/1963 | Andrew | 260—153 |
| 3,424,738 | 1/1969 | Andrew | 260—146 T |

LORRAINE A. WEINBERGER, Primary Examiner

C. F. WARREN, Assistant Examiner

U.S. Cl. X.R.

260—148, 149, 150, 151, 153, 184, 191, 193, 194, 196, 198, 205, 206, 207, 207.1, 207.5

UNITED STATES PATENT OFFICE
CERTIFICATE OF CORRECTION

Patent No. 3,826,799    Dated July 30, 1974

Inventor(s) David Richard Waring

It is certified that error appears in the above-identified patent and that said Letters Patent are hereby corrected as shown below:

In the Heading:

Add the following:

--Claims priority, application Great Britain

September 10, 1971, 42354--

Signed and sealed this 12th day of November 1974.

(SEAL)
Attest:

McCOY M. GIBSON JR.
Attesting Officer

C. MARSHALL DANN
Commissioner of Patents